D. T. SHARPLES.
BELT SHIFTING MECHANISM.
APPLICATION FILED NOV. 17, 1916.

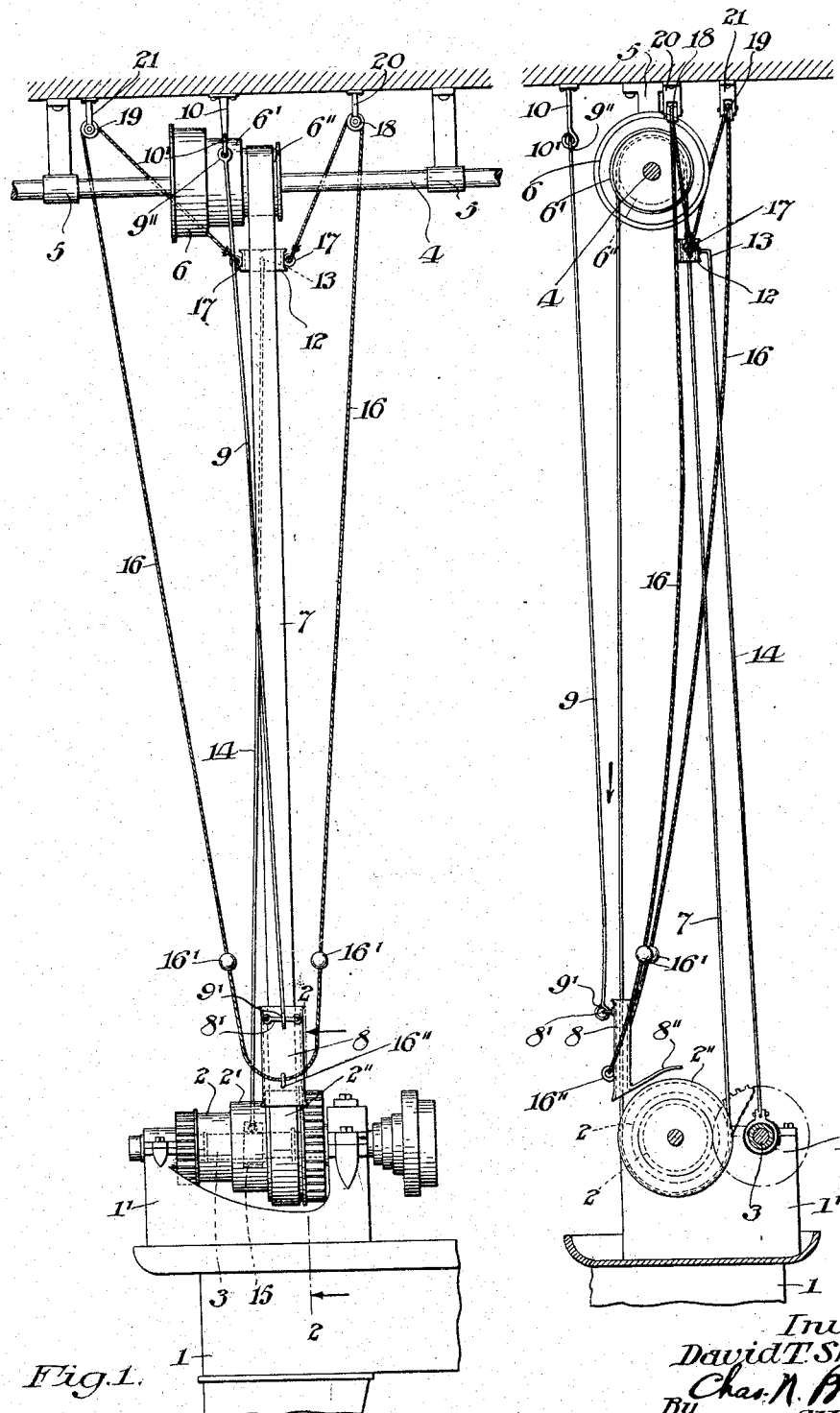

1,223,430.

Patented Apr. 24, 1917.
2 SHEETS—SHEET 2.

Inventor:
David T. Sharples,
Chas. N. Butler
By                Attorney.

UNITED STATES PATENT OFFICE.

DAVID TOWNSEND SHARPLES, OF WEST CHESTER, PENNSYLVANIA.

BELT-SHIFTING MECHANISM.

1,223,430.　　　　Specification of Letters Patent.　　Patented Apr. 24, 1917.

Application filed November 17, 1916. Serial No. 131,816.

*To all whom it may concern:*

Be it known that I, DAVID TOWNSEND SHARPLES, a citizen of the United States, residing at West Chester, in the county of Chester and State of Pennsylvania, have invented certain Improvements in Belt-Shifting Mechanism, of which the following is a specification.

My invention is an improved belt shifting mechanism adapted for general use but it is intended especially for shifting belts on cone or differential pulleys such as are used for operating lathes, and its primary object is to provide a safety device of simple, inexpensive and efficient character for shifting cone pulley belts.

Figure 3:
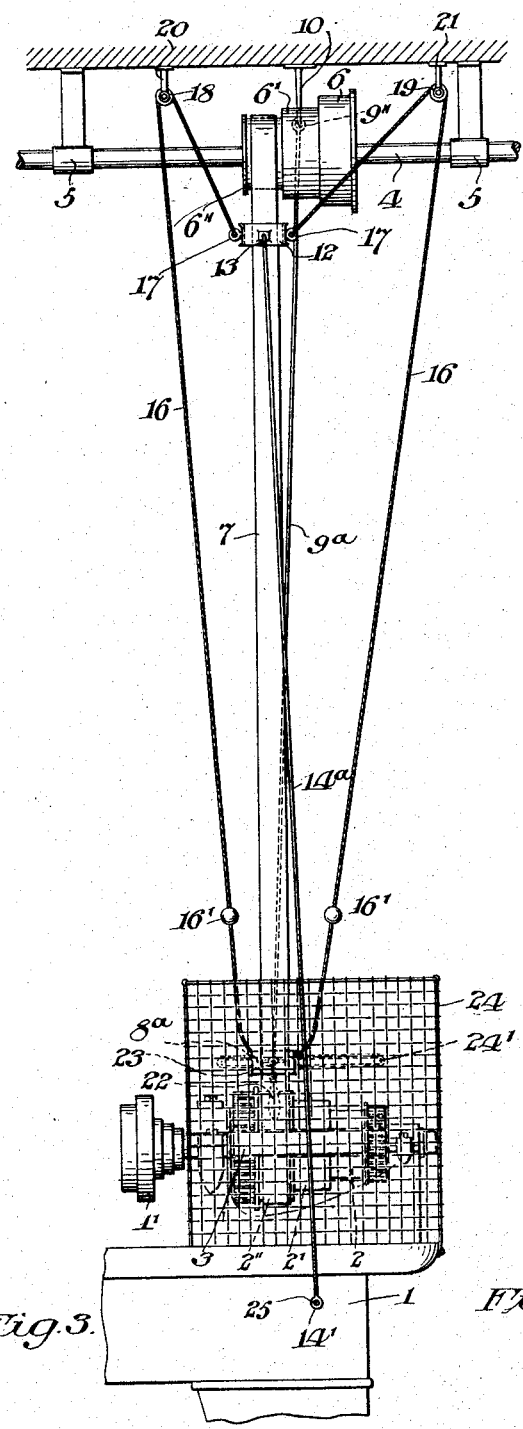
Figure 4:
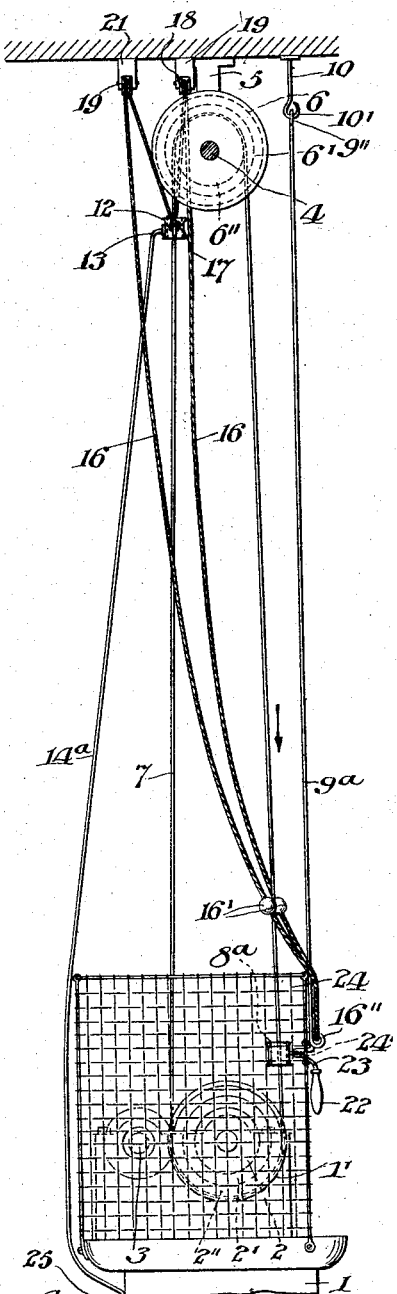

In the accompanying drawings, Figure 1 is a side elevation of mechanism embodying my invention; Fig. 2 is a part sectional elevation of the same taken on the line 2—2 of Fig. 1; Fig. 3 is a side elevation opposite that shown in Fig. 1 illustrating a modified construction, and Fig. 4 is an end elevation of the structure shown in Fig. 3.

The mechanism shown in the drawings to illustrate the application and character of my invention comprises lathe shears 1 with the lathe head 1' which is provided with the usual operating parts comprising a cone pulley having the differentials 2, 2' and 2'' and the back shaft 3.

A power shaft 4, journaled in the hangers 5, has fixed thereon a cone pulley provided with the differentials 6, 6' and 6''. These differentials 6, 6' and 6'' are adapted to be connected with the respective differentials 2, 2' and 2'' by the belt 7, for the purpose of operating the lathe at the several speeds, in the usual manner.

It has heretofore been a usual practice to shift the belts for such pulleys by hand, but this is objectionable because the belt is thrown off and on the desired differentials by applying the hand to belt sections approaching the pulleys, with the possibility that the hand may be caught between the belt and a pulley.

In carrying out my invention, to avoid this danger, the section of the belt 7 approaching the lower pulley 2—2'—2'' is, as illustrated in Figs. 1 and 2, embraced by and runs through a flattened collar or sleeve 8 which is connected flexibly at or near its top with the bottom of a rod 9, the connection shown being made by a bearing in the form of a loop 8' fixed to the sleeve and an eye 9' containing the bearing. The bottom of the sleeve 8 is provided with a guard 8'' over the juxtaposed pulley. The top of the rod 9 is connected flexibly with a hanger 10 which, as shown, is provided with an eye or closed hook 10' passing through an eye 9'' at the top of the rod 9.

The members 8 and 9, which are light and provided with flexible supporting connections, move freely transversely to their lengths, floating without resistance with every lateral movement of the belt section passing through the part 8.

The section of the belt 7 approaching the pulley 6—6'—6'' runs through a flattened collar or sleeve 12 which has a connection 13 with the top of a rod 14, the bottom of this rod being movably supported, as by a collar 15 fixed thereto and extending loosely around the back shaft 3 so that the rod and the collar supported thereby can float with every lateral movement of the belt section running through the sleeve.

A cord 16 is connected with oppositely disposed eyes 17 on the sleeve 12 and runs over the pulleys 18 and 19, which are carried by the hangers 20 and 21 above the sleeve 12. The cord passes through an eye 16'' on the sleeve 8 and has thereon the balls 16' adapted to provide hand-holds as also to engage the eye 16'' so that the sleeves can be thrown in opposite directions by a single pull on the cord. The pulley 18 nearest the differential 6'' is disposed, as shown, so that the section of the cord running from the sleeve 12 thereto will lie near the extended cylindrical surface of the differential 6'' and the section of the cord running from the sleeve to the pulley 19 will lie near the extended cylindrical surface of the differential 6 to facilitate shifting the belt to such differentials by pulling the cord over the corresponding pulleys 18 and 19.

The operator, to stop his machine or change its speed, can do so, for example, by grasping the sleeve 8 with his hand and moving it so as to throw the belt 7, which is moving through the sleeve, in the direction of the adjacent arrow, onto the differential 2', and, if the speed is to be increased, the cord 16 is drawn over the pulley 19 and the sleeve or collar 12 is moved thereby so as to throw the belt onto the differential 6'. With the belt running on the differentials 2' and 6', the speed is decreased by drawing the cord 16 through the pulley 18 and causing the sleeve or collar 12 to shift the belt onto the differential 6" and moving the sleeve or collar 8 so as to throw the belt onto the differential 2".

The device may be modified, as illustrated in Figs. 3 and 4, where a floating sleeve or collar 8ᵃ is suspended by a floating rod 9ᵃ depending from the hanger 10 and is connected with a handle 22 by a thong or flexible member 23, the thong passing through a slot 24' of a cage 24 for surrounding the movable parts and protecting the operator from injury thereby. The belt 7 can be shifted from one to another of the differentials 2, 2' and 2" by appropriately operating the handle 22 which acts through the thong 23 on the sleeve or collar 8ᵃ. In this form of the device, the sleeve or collar 12 is supported by a rod 14ᵃ having an eye 14' in the lower end thereof through which a screw 25 passes into the shears 1, the eye being loose on the screw so as to move freely without escaping therefrom and to permit the collar 12 to float freely with the motion of the belt 7 passing therethrough.

The cord 16 passes through an eye 16" on the part 9ᵃ, is provided with the knobs 16' and passes over the pulleys 18 and 19 to the eyes 17 of the part 12, as and for the purpose previously described.

Having described my invention, I claim:

1. A belt shifter comprising a device through which a belt is adapted to run freely and means for supporting said device so that it can float freely with the lateral movements of the belt section running therethrough.

2. A belt shifter comprising a device through which a belt is adapted to run freely and floating means for supporting said device so that it can move freely in transverse directions, transversely to the belt section passing therethrough.

3. A belt shifter comprising a collar adapted for substantially surrounding a belt adapted to run freely therethrough and a rod adapted to oscillate universally for supporting said collar.

4. A belt shifter comprising a device adapted for substantially surrounding a belt adapted to run therethrough, floating means for supporting said device so that it can move universally, and flexible hand operated means connected with said device for shifting it.

5. A belt shifter comprising a device adapted for substantially surrounding a belt adapted to run freely therethrough, means adapted to oscillate universally for supporting said device, and means connected with said device so that it can be pulled in opposite directions.

6. The combination of a pulley having differentials and a belt adapted for engagement with said differentials, of a device through which said belt is adapted to run freely and means adapted to oscillate universally for supporting said device in proximity to said pulley.

7. The combination with a pair of pulleys respectively having differentials and a belt connecting said pulleys, of floating devices supported adjacent to the respective pulleys and through which said belt is adapted to run freely, and means connecting said floating devices whereby they are adapted to be operated to shift said belt.

8. The combination with an upper and lower pulley respectively provided with differentials and a belt connecting differentials of the respective pulleys, of a depending oscillatory rod, a collar supported thereby adjacent to said lower pulley and loosely embracing said belt, a rod freely supported at its lower end, a collar supported by said last named rod at its upper end adjacent to said upper pulley and loosely embracing said belt, and means for connecting said collars.

9. The combination with a pair of differential pulleys and a belt for connecting them, of a freely floating sleeve through which said belt is movable freely, and mechanism comprising a flexible tension member for moving said sleeve in opposite directions and shifting said belt.

10. The combination with a pair of differential pulleys and a belt for connecting them, of a freely floating sleeve through which said belt is movable freely, and means comprising a handle connected with said sleeve for moving it in opposite directions and shifting said belt.

In testimony whereof I have hereunto set my name this 8th day of November, 1916.

DAVID TOWNSEND SHARPLES.